Patented Nov. 15, 1927.

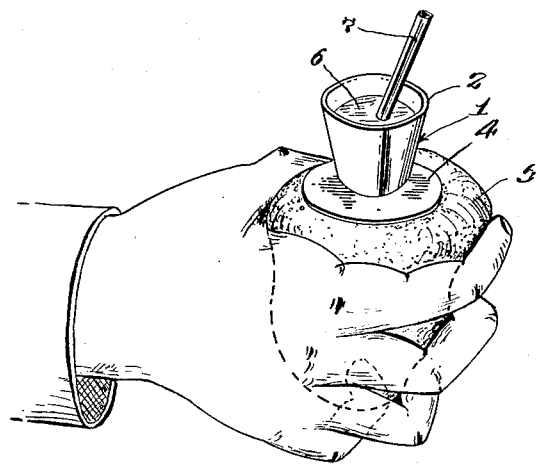
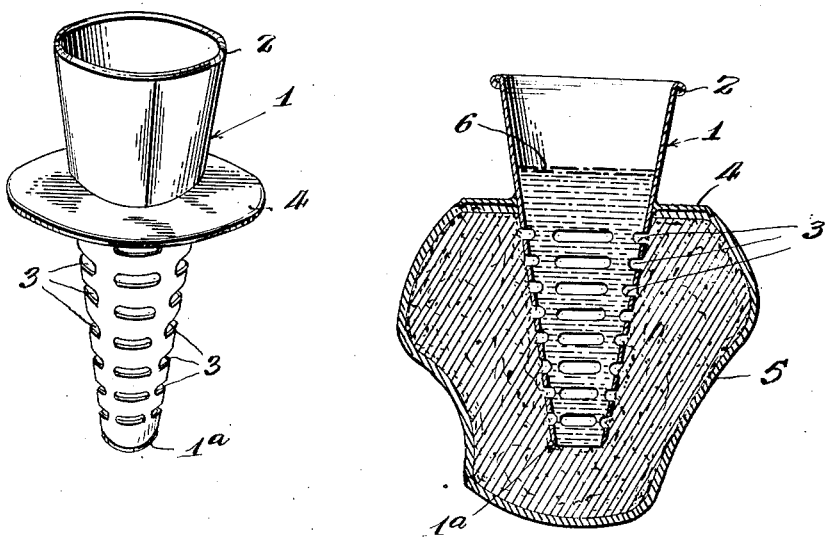

1,649,755

UNITED STATES PATENT OFFICE.

ALBERT W. THOMPSON, OF MIAMI, FLORIDA.

FRUIT-JUICE EXTRACTOR.

Application filed May 13, 1925. Serial No. 30,028.

My invention is an improved extractor for use in removing the juice of a citrus or other suitable fruit, and it consists in the combinations, constructions and arrangements herein described and claimed.

An object of the invention is the provision of a device which can be used quickly and easily to effect the removal of practically all the juice from a fruit in a sanitary manner so that there will be but little, if any, likelihood of contamination of the fruit juice.

A further object of the invention is the provision of a fruit juice extractor of the character described which affords facilities for holding the extracted juice so that it can be imbibed direct from the extractor without there being any necessity of transferring the juice to a cup or like vessel.

A still further object of the invention is the provision of an extractor of the character described which can be thoroughly and effectually cleaned and sterilized when required and which includes no recesses or other places inaccessible to a cleaning or sterilizing fluid.

Other objects and advantages of the invention will be apparent from the following description, considered in conjunction with the accompanying drawing, in which Figure 1 is a perspective view showing the improved extractor applied to a fruit, Figure 2 is a vertical section through the fruit and through the extractor, and Figure 3 is a perspective view of the extractor.

The improved extractor comprises a tubular cup-like body 1 which tapers slightly from one open end to its opposite open end and may be formed with an outwardly turned bead 2 at its larger end. The tubular body 1 may be made of any suitable material, such as porcelain, glass, or a light gauge metal and preferably is made of material which will not be impaired by the action of the juices of the fruit with which it is to be used. The body 1 is formed with lateral perforations or apertures 3 from its smaller end for part of its length. These apertures 3 may have any desirable configuration, area, and relative arrangement. They are shown as being horizontally elongated openings arranged in circumferential rows which extend longitudinally of the body 1 for part of the length of the latter.

A combined stop and sealing annular flange or shoulder 4 fits on the body 1 in a plane which is proximate to the highest aperture 3 and intersects the body 1 between the apertured portion of the body 1 and the larger end of the body. The walls of the body 1 are imperforate from the combined stop and sealing flange 4 to the larger end of the body.

From the foregoing description of the various parts of the device, the operation thereof may be readily understood. The smaller end of the body is forced through the rind or skin of a fruit, such as that indicated at 5 so that the perforated portion of the body will be imbedded in the fruit along the axis of the latter, the core of the fruit being received within the perforated portion of the body 1 and the combined stop and sealing flange pressing against the fruit at the mouth of the opening in the fruit in which the apertured portion of the body 1 is received. The fruit then is grasped in the hand and is compressed toward the apertured portion of the body 1. It is obvious that the juice of the fruit will be forced through the apertures 3 into the body through the core portion 1 and thence upward in the latter into the imperforate upper portion of the body 1, as indicated at 6 in Figures 1 and 2. The juice may be sipped from the upper end portion of the body 1 in the same manner as from a cup, the extreme upper edge being rounded or beaded for that purpose or it may be imbibed from the body 1 by means of straws, such as indicated at 7, or can be poured from the body 1 into any suitable vessel or receptacle for subsequent consumption or use. The flange 4 not only serves as a stop for limiting the projection of the smaller end of the body 1 into the fruit but also presses against the rind or skin of the fruit at the mouth of the opening in which the apertured portion of the body 1 is received and prevents escape of juice from the fruit at the point of entry of the body 1 into the fruit. The body 1 preferably has the extremity of the apertured portion thereof formed with a cutting edge, as indicated at 1ª, and loosens the core.

Obviously, the invention is susceptible of embodiment in forms other than that which is illustrated in the accompanying drawing, and I therefore consider as my own all such modifications and adaptations thereof as fairly fall within the scope of the appended claim.

I claim:—

In a device of the character described a cup shape body member open at its upper and lower ends, the upper end comprising a relatively wide mouth, the body tapering slightly downwardly, and the lower open end having a sharp edge, whereby to readily enter the fruit and core out a portion thereof, a portion of the body member from its lower end and upward provided with rows of slots, whereby to permit the juice to be expressed into the cored portion and into the upper portion of the cup, by external pressure applied to the fruit.

ALBERT W. THOMPSON.